United States Patent [19]

Janek

[11] Patent Number: 5,620,126
[45] Date of Patent: Apr. 15, 1997

[54] L-SHAPED SUPPORT BEAM WITH DEMOUNTABLE WHEELED CONTAINER

[76] Inventor: Nikolas C. Janek, 789 Deepwoods, Aurora, Ohio 44202

[21] Appl. No.: 611,124

[22] Filed: Mar. 5, 1996

[51] Int. Cl.⁶ .................................................. B60R 9/055
[52] U.S. Cl. .................... 224/527; 224/526; 224/529; 224/282; 224/509
[58] Field of Search ........................... 224/280, 282, 224/488, 502, 509, 521–532; 414/462

[56] References Cited

U.S. PATENT DOCUMENTS

| | | | |
|---|---|---|---|
| 2,136,157 | 11/1938 | Thomas | 224/282 |
| 4,593,840 | 6/1986 | Chown | 224/527 |
| 4,596,347 | 6/1986 | Hite | 224/280 |
| 4,744,590 | 5/1988 | Chesney | 224/526 |
| 4,915,276 | 4/1990 | Devito | 224/529 |
| 5,018,651 | 5/1991 | Hull et al. | 224/526 |
| 5,029,740 | 7/1991 | Cox | 224/527 |
| 5,038,983 | 8/1991 | Tomososki | 224/527 |
| 5,106,002 | 4/1992 | Smith et al. | 224/526 |
| 5,215,234 | 6/1993 | Pasley | 224/527 |
| 5,310,100 | 5/1994 | Liscinsky | 224/527 |
| 5,395,020 | 3/1995 | King | 224/527 |
| 5,439,151 | 8/1995 | Clayton | 224/282 |
| 5,460,304 | 10/1995 | Porter et al. | 224/527 |
| 5,518,159 | 5/1996 | DeGuevara | 224/282 |
| 5,544,799 | 8/1996 | Didlake | 224/282 |

*Primary Examiner*—Henry J. Recla
*Assistant Examiner*—Gregory M. Vidovich
*Attorney, Agent, or Firm*—Alfred D. Lobo

[57] ABSTRACT

A cargo carrier assembly (or "carrier") is externally carried at the rear of a truck. The carrier comprises a frameless L-shaped rack in combination with a wheeled container specifically adapted to be pivotably loaded onto the rack by using pivot latches which matingly receive locking pins fixedly secured to the container. The rack comprises either a single integral L-shaped support beam, or a compound beam. The compound beam, in turn, comprises a combination of (a) a pivot strut one side of which is attached to the frame of the truck and (b) an integral L-shaped support beam comprising a transverse strut and a longitudinal strut upon which latter strut only, the container is pivotably disposed. Only a portion of the base of the container is either directly supported on the struts of the L-shaped rack, or supported on pivot pins. Though the container may be secured with only two pivot latches, it is preferred to use, in addition, an attachment latch. The width of the wheeled container is chosen so that it can be rolled in an inclined position through a doorway of a conventional dwelling, and the length is chosen so that, when loaded on the rack, the container does not obscure the tail-lights of the truck.

11 Claims, 5 Drawing Sheets

L-SHAPED SUPPORT BEAM WITH DEMOUNTABLE WHEELED CONTAINER

BACKGROUND OF THE INVENTION

This invention relates to a cargo carrier assembly (or "carrier") comprising an L-shaped support beam in combination with a wheeled container, the carrier being externally carried at the rear of a pick-up truck, minivan, or sport-utility vehicle, individually and collectively referred to as a "truck" hereafter.

Numerous solutions to the problem of carrying a container for cargo outside an automobile or truck, at the rear thereof, have been presented over the past six decades or so, each solution depending upon the manner in which the problem was perceived. Moreover, the dimensions of the container were rarely accorded much weight. In the novel carrier described herein, the container and its dimensions are essential considerations; and, use of the carrier on an automobile is excluded.

Nearly a half a century ago, in U.S. Pat. No. 2,136,157 issued to Robt. J. Thomas, he disclosed a rearwardly extending swing-away rectangular frame on which a trunk is carried at the rear of an automobile, and the trunk is swung out of the way, in the vertical plane.

U.S. Pat. No. 5,018,651 to Hull et al discloses a unitary T-shaped connection member, arms of which support a dumping container pivotably mounted on the T. Any end of the T may be inserted in a socket of a hitch on the frame of a truck. The container is designed to be loaded empty and dumped, since if pre-loaded, there is no provision for lifting it on to pivot hinges on the cross-arm of the T. Further, the container is built on a tubular steel or angle iron framework, and is not wheeled. The swivel wheel disclosed in '651 is for attachment to any point on the T-shaped beam. The container may be pivoted in any direction depending upon which end of the T is inserted in the trailer hitch. Irrespective of the direction in which the container is to be pivoted, the cross-arm of the T is provided with hinges permitting the container to be pivoted about the longitudinal axis as shown in their FIG. 1, or about the transverse axis as shown in their FIG. 2 so that the container may be dumped from the side or from the end. The longitudinal direction, corresponding to the forward and rearward directions in which the truck travels, is referred to as the x-axis herein; and the direction at right angles to the longitudinal axis is referred to as the y-axis.

U.S. Pat. No. 5,029,740 to Gary L. Cox discloses a wheeled frame or dolly to which a container for luggage is integrally secured so that the dolly can be rolled to and releasably locked to a support arm uniquely designed to lift the dolly onto a support structure. Besides requiring the container to be secured to the dolly by means of straps placed within the container, it is necessarily transported in an inclined position behind the vehicle, rather than in a horizontal position in which it would not interfere with the driver's rear view through the rear window. To raise the container and dolly by pivoting it as shown, the pair of pivot arms used to lift the dolly into place requires a force far greater than that required to pivot the same container about twin oppositely disposed pivot pins positioned near the mid-points of the sides of a container, as is done in the surprisingly effective and simple invention described herein.

SUMMARY OF THE INVENTION

It is a general object of this invention to provide a cargo carrier for a truck, the carder comprising a rigid light-weight but ragged L-shaped frameless utility rack and a wheeled container having a rigid tub with a planar base which tub is manually demountably locked on the upper surface of the rack without the use of tools. An essential feature of the rack is that its transverse member is maintained closely adjacent and parallel to the truck's rear bumper with a connection member in the form of a short stub or shank. An essential feature of the container is that the axis of its wheels is near one end of the tub which has pivot pins secured on or near the container's base, the pins being located at a critical distance from the axis of the wheels such that the pins may be received in pivot latches on the L-shaped rack without the wheels being lifted off the ground. The mounting of these pivot pins in opposed, linearly spaced-apart relationship, when matingly received in the pivot latches determines that only a portion of the base of the tub is supported on the pins, this supported portion being at least half the base, and preferably a major portion of the base. Moreover, the tub is frameless, being preferably molded from a synthetic resinous material, optionally reinforced, or a light metal.

It is a specific object of this invention to provide an L-shaped rack, designed and constructed as a support beam having only a longitudinal arm and a transverse arm; only the longitudinal arm carries pivot means which also function as latches because they receive and lock pins on the tub, hence referred to as "pivot latches". The arms are positioned so that the container is directly supported only along a portion of its forward side, adjacent the truck's rear bumper, and across the container's planar base, by the transverse arm and the longitudinal arm, respectively. The transverse arm of the L-shaped support beam may be a single integral beam, or, a L-shaped support beam with a compound transverse arm, and in each case, the container is pivotably latched to the "L".

The unique L-shaped design allows the beam to be connected to the truck only at the transverse arm of the L-shaped beam, and necessitates the wheeled container be side-loaded onto the beam, and unloaded, from one direction only, by pivoting the container about the longitudinal axis (x-axis) of the "L". The L-shaped support beam, generally planarly disposed with its transverse arm in close proximity behind the truck's bumper, is most preferably formed from rectangular steel or aluminum tubular stock and/or rectangular channel stock. The rectangular stock presents a large enough surface so as to avoid the generation of stresses within the matrix of the synthetic resinous material from which the container is preferably formed. Such stresses are relatively large when the container rests on cylindrical tubing and such stresses are deleterious to the useful life of the tub. To attach the transverse arm of the L-shaped support beam to the truck, there is a single mounting shank which is slidably, removably inserted into a securing means such as a square tubular receiver which provides a trailer hitch or socket fixed to a rigid member which is part of the truck's frame. The mounting shank is necessarily a short stub not much longer than the length required to position the transverse arm adjacent the rear bumper; the shank is typically less than about 46 cm (18 ins) long, preferably in the range from 15 cm (6") to 38 cm (15") long.

The L-shaped support beam is referred to as being "frameless" because it comprises only a support beam which may be either (i) a single, integral L-shaped support beam having a single longitudinal strut and a single transverse strut, referred to as the first L-shaped support beam "$L^1$", or, (ii) an L-shaped support beam having a single longitudinal strut, and a single transverse compound strut, referred to as the second L-shaped support beam "$L^2$". The transverse compound strut is a combination of only two integral beams, namely (i) a pivot strut and (ii) the transverse strut of the L-shaped support beam, the strut (ii) being pivotably disposed with respect to the strut (i), the pivot strut being releasably secured in the socket on the frame of the truck. When the wheeled container is positioned on the rack, the container's length (longest dimension) lies along the transverse y-axis; its width lies along the longitudinal x-axis; and its depth lies along the z-axis. By "integral" is meant that the components of each support beam are fixedly secured, for example, by welding.

It is another specific object of this invention to provide a wheeled container having a rigid tub particularly adapted to be pivotably loaded onto the rack, the tub being generally rectangular in cross-section, preferably with a lid for the tub, both made of light weight but strong materials. The tub is provided with at least two oppositely directed, spaced-apart pins secured to (hence referred to as "locking pins") and protruding longitudinally from its planar base, along a line drawn through the mid-portion of the base. Though a tub of conventional construction may be used, in the most preferred embodiment, the tub has no planar framework, either internally or externally (hence "frameless tub"), to support the load carried in it, and when transported on the truck, the tub is preferably secured with an attachment means on the transverse arm, in addition to the pair of pivot latches. The tub is therefore supported only on the transverse and longitudinal arms of the L-shaped support beam. The container may be loaded indoors with so much luggage that the container cannot be lifted off the ground by only one person; thus, goods including luggage, may be conveniently arranged within the tub with due care while indoors, irrespective of weather conditions outdoors, so that optimum packing is achieved for the travel conditions expected, and the container may then be wheeled outdoors through the doorways.

It is a specific object of this invention to provide a wheeled container which can be rolled along the ground in an inclined position, preferably on a pair of wheels mounted, optionally vertically telescopably, one on each side, near each lower corner at one end of the container's base. Additionally, the tub is provided with locking means fixed near the tub's base, which locking means cooperate with a pair of pivot latches and, optionally, additional locking means, either above or below the upper surface of the rack, to secure the container. The preferred combination of two pivot latches, a third attachment latch, and locking pins on the tub, is unexpectedly effective and easy to use despite physical constraints of positioning the container closely adjacent to, preferably within about 46 cm (18") of the outer surface of the rear door of the truck, which constraints appear to militate against using many known attachment means for manual operation. Thus the weight of a loaded container is kept as close to and above the truck's rear axle as is practical.

More particularly the cargo carrier allows a pre-loaded wheeled container to be rolled to the truck in an inclined position on two wheels, pivoted onto, and then secured on the rack. Using a compound transverse beam allows the hinged frameless rack with the container on it, to be swung in the horizontal plane, out of the path of an opening door of the truck, so as to provide access to the truck's interior passenger seating and/or storage compartment. Further, it is critical that the length of the container (x-axis, when the container is on the rack) be less than the transverse distance (y-axis) between the truck's rear lights; and, the depth (z-axis) of the container be such that the lid of the container lies in a plane in which the view through the rear-view mirror of the truck is not obscured, preferably below the lower edge of the truck's rear window.

In addition, it is a specific object of this invention to provide a container, no longer than the distance between the truck's tail lights, so that the length of the container is critical; in addition, the width is also critical since it must pass through a conventional doorway of a dwelling when transported in an inclined position. Because of the limited depth of a tub which is typically available by a combination of physical considerations, the internal volume of the container is in the range from about 15–30 ft$^3$ (0.42–0.85 cubic meters). Such considerations include the dimensions of a conventional truck, the load in the container which a person can conveniently handle, and the load which will not adversely affect the handling of the truck.

It is another object of the invention to provide a cargo carrier comprising in combination, a frameless L-shaped rack, a connection member for connecting the transverse arm of the "L" to the truck's frame, a container demountably locked along the longitudinal axis of the "L", and an accessory rack demountably attached to the longitudinal arm of the "L", the accessory rack comprising a vertical T-shaped member on which accessory articles such as skis or bicycles may be carried.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Numerous suggestions for carrying a container on a rack have been proffered to date, but none has suggested a carrier comprising a combination of a frameless rack and a container designed and constructed to allow it (i) to be preloaded conveniently, for example with luggage, in a room of a house or motel/hotel (referred to as a "dwelling"); (ii) to be wheeled in an inclined position through conventional doors of the dwelling (such doors are generally about 30 inches wide, or 76 cm wide) to a position near the rack; then, without lifting the container off the ground, (iii) to be pivoted on cooperating pivot means (fixedly disposed on both the container and the rack) to lock the container on the rack, manually, by a single person of average strength, without using tools. Upon arriving at one's destination dwelling, the person may unload the container by (i) unlocking the locking means and pivoting the container without lifting it off the rack, so that the wheeled end of the container contacts the ground, then (ii) wheeling the container through conventional doors into the dwelling so that the luggage is transported from the truck in a single trip. The wheeled container, specifically designed as described to cooperate with the rack, thus permits the luggage to be easily and conveniently transported to a destination, then wheeled into the dwelling. This avoids leaving the contents of the container unattended outdoors, albeit still within the container which is typically provided with a lid locked to its body.

Figure 1:
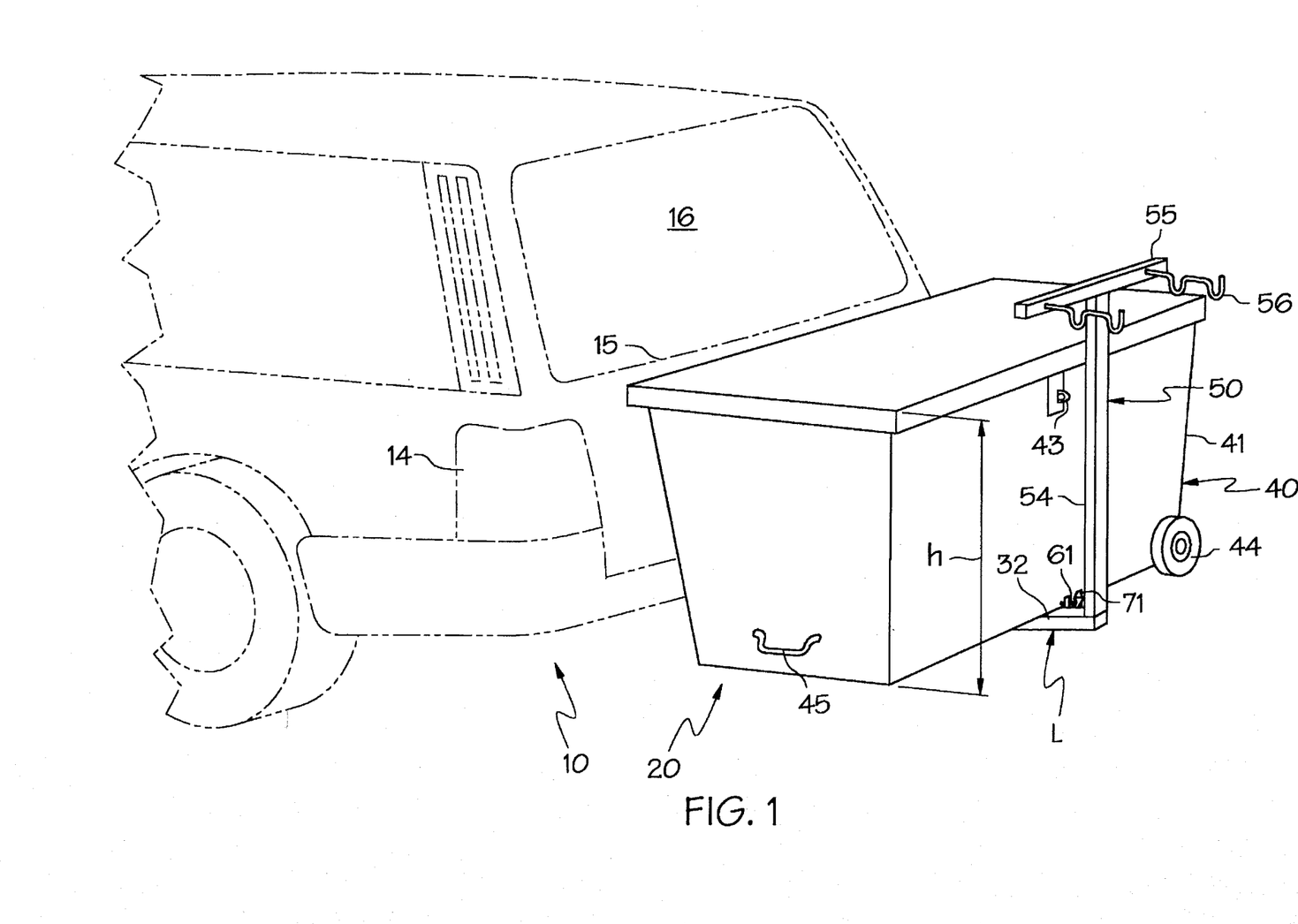
FIG. 1 is a generally schematic view of the carrier in transport position, the carrier including a L-shaped frameless rack, a wheeled container and an optional T-shaped accessory rack, all carded behind a 4×4 sports utility vehicle provided with a socket for a trailer hitch fixedly attached to the frame of the vehicle.

Referring to FIG. 1. there is shown a 4×4 sport utility vehicle, indicated generally by reference numeral 10, to which a carrier assembly, indicated generally by reference numeral 20 is removably attached. Typical of such sport utility vehicles are the Chevrolet Blazer, the Ford Explorer, and the Nissan Pathfinder. Other suitable vehicles are pick-up trucks such as the Dodge Ram, the Ford F150 and the Chevrolet C-1500 or K-1500. Still other suitable vehicles are vans and minivans. The "carrier assembly" 20 refers to a combination of L-shaped rack L, and the wheeled container indicated generally by reference numeral 40, which is secured to the rack with pivot means which also serve as attachment latches. Optionally, for use as a bicycle carrier, ski rack, and the like, a removably mounted, accessory rack 50 of arbitrary construction, preferably having a vertical T-shape, with appropriate accessory suspension means, is provided.

Figure 2:
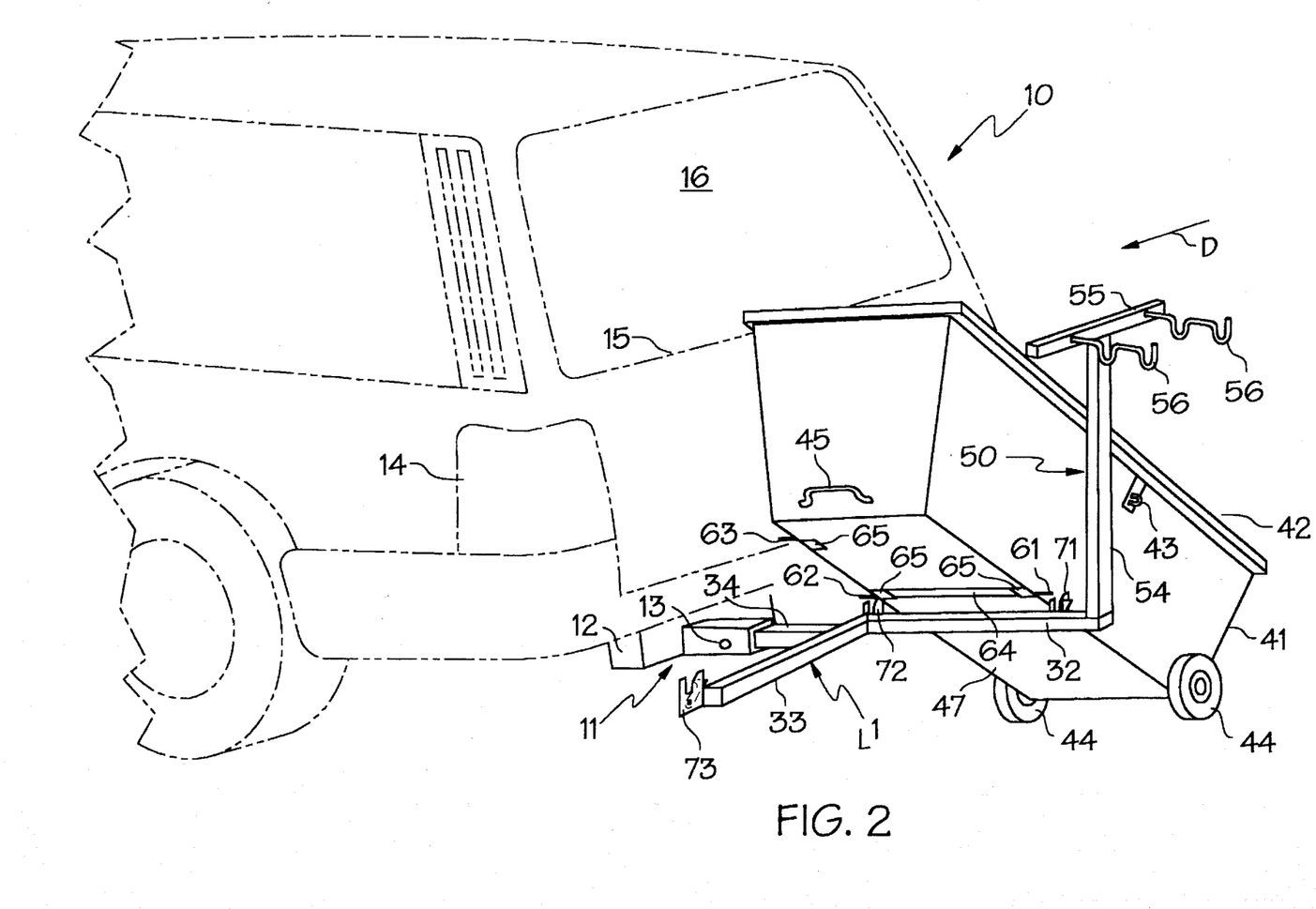
FIG. 2 is a generally schematic view of the container as it rests in position to be pivoted onto a first embodiment of the rack comprising an integral planar L-shaped support beam $L^1$ ("first L-shaped support beam"), the rack being connected to the truck with a shank. If desired, the accessory rack, shown in position, may be positioned before or after the container is positioned. Locking pins on or near the bottom of the tub of the container are held in a pair of oppositely disposed pivot latches along the longitudinal axis of the rack so that the container may be pivotably disposed on the longitudinal strut of $L^1$.

Referring to FIG. 2, there is shown a first embodiment of an L-shaped support beam $L^1$, removably connected to the truck's frame 12 with a short connection stub or shank 34 and the wheeled container 40 which can only be loaded onto $L^1$ in the direction of the arrow D, that is, from the right hand side (the passenger's side) of the track. The container 40 typically has a rigid unitary body with an internal volume in the range from about 15–30 ft$^3$ and is too large to be carded exteriorly of a conventional automobile; and, if the container is used for its intended purpose as described herebelow, the loaded container transported on an automobile would adversely influence the normal operation and handling of the automobile.

The tub 41 has substantially vertical walls and an integrally formed, generally planar base 47, preferably of glass fiber reinforced ("GFR") synthetic resinous (plastic) material, a metal composite or aluminum. Alternatively, the tub may be formed from a substantially rigid unreinforced plastic material. By "substantially rigid" is meant that the tub, upside down, can support a load of about 300 lb (136 Kg), or the weight of two average persons standing or sitting on the tub's planar base with no readily visible deflection of the base or walls. The tub is preferably rigid enough to be supported on its locking pins without also supporting the lower surface of its planar base, though, to minimize stresses on the base, it is preferred to support the planar base when the locking pins are secured in their attachment latches. A preferred container is 117 cm long×68 cm wide×71 cm deep (46"×27"×28") and has an interior volume sufficient to carry plural suitcases and/or other personal effects, such as hiking or biking gear (collectively referred to as "luggage" hereafter), which would not only occupy too much space if stored within the vehicle, but would also be required to be handled individually for loading and unloading into the truck. A suitable container is commercially available from Better Way Products Inc., New Paris, Ind. 46553.

Figure 3:
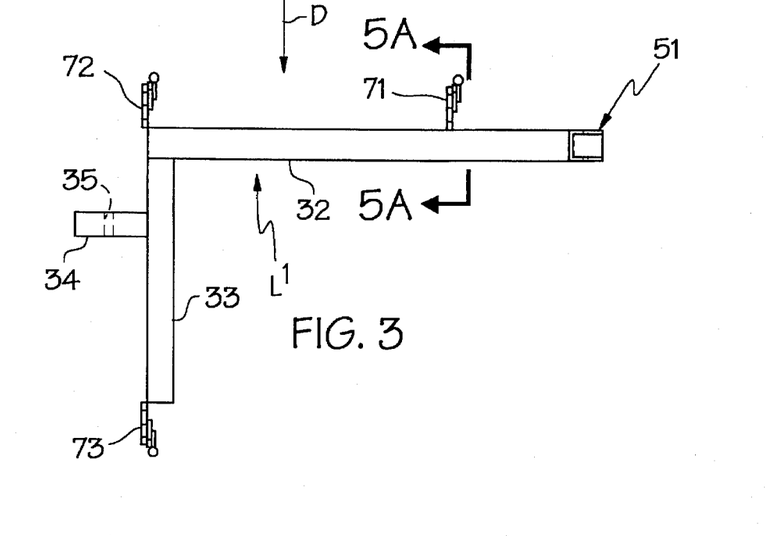
FIG. 3 is a plan view of the first L-shaped support beam without the T-shaped accessory rack showing the use of the two pivot latches and an additional spaced-apart locking means such as an attachment latch.

As schematically illustrated in FIG. 3, $L^1$ is an integral support beam having only a longitudinally (x-axis) extending strut 32 and a transversely (y-axis) extending strut 33. By "integral" is meant that the struts of $L^1$ are fixedly secured, for example, by being welded. As shown in FIG. 2, the accessory rack 50 comprises a vertical tubular post 54, preferably of rectangular stock into the base of which stub 51 is insertable and the base is provided with matching passages (not shown) to allow fastening pins to be inserted through the passages when aligned with passages 52 and 53 in the stub 51. The top of the post 54 is secured to a cross-member 55 on which connecting means for accessories, such as suspension hooks 56 (shown), or clamps for skis, are provided for carrying the particular accessory. The simple construction of the accessory T-rack lends itself exceptionally well to be combined with the rack of this invention.

The carrier assembly 20 comprises the L-shaped support beam $L^1$ constructed of rigid rectilinear struts only, and a wheeled container 40 having a tub 41 of specified critical volume in the range set forth above, the tub being provided with a lid 42, preferably hinged. The tub 41 is generally a parallelpiped and the hinged lid 42 is preferably provided with a hasp 43 to lock the container. The container can only be loaded or unloaded from the top when the lid is in the upright position. If loaded with suitcases, plural suitcases may be ganged, positioned so that handles of the suitcases are uppermost. A typical suitcase (not shown) is loaded with its longer dimension along the x-axis so that the depth of the tub is from 10% to 50% greater than the height of the suitcase placed within the tub, but the depth is such that the height "h" of the container 40 with the lid 42 closed is preferably no greater than the distance of the lower edge 15 of the rear window 16 from the upper surface of $L^1$. The width of the tub (measured along the longitudinal x-axis) is typically at least as wide as the longest dimension of a typical suitcase. The length of the tub (measured along the y-axis) is less than the distance between the inner edges of the rear tail-lights 14 (only one of which is shown), so the tail-lights are visible from the rear when the container is on the rack. It will now be evident that the tub 41 will be longer than it is wide, and its width is limited by the width of a doorway through which the container is to be wheeled. Such containers are commercially available either formed from GFR plastic, or of thermoformed acrylonitrile-butadiene-styrene ("ABS") copolymer. For optimum rigidity and light weight the container may be made of a suitable synthetic resin reinforced with whiskered carbon fibers using technology conventionally used in the fabrication of golf clubs, tennis rackets and certain military aircraft. Casters 44, preferably solid rubber wheels, are provided along a common longitudinal axis, near opposed lower corners of the tub at its one end. The manner in which the wheels 44 are fixedly attached to the tub 41 is not critical but for optimum adjustability, namely to minimize the vertical distance through which the tub is to be pivoted onto the longitudinal strut 32, it is preferred to use telescopable wheels. At its other end, the tub 41 is provided with a handle 45 with which sufficient force is applied to rotate said container in a vertical plane at right angles to the longitudinal axis, onto the rack.

Positioned about midway between the handle 45 and the common axis of the wheels 44 are oppositely disposed, substantially co-axial pivot locking pins 61, 62 which are matingly received in pivot latch means 71 and 72 when the tub is wheeled against the longitudinal strut 32, without lifting the wheels off the ground. The distance of the mounting axis of the pivot pins 61, 62 from the axis of the wheels is therefore at least the same as the height at which the pivot latches 71, 72 are mounted. The locking pins 61, 62 and 63 are typically in the range from about 0.65 cm to about 1.6 cm in diameter, about 1.25 cm being preferred; and in the range from about 2.5 cm to about 7.5 cm long, about 5 cm being preferred. Such pins are conveniently provided on small laminar pads which are fixedly secured to the base. Pads may be in the range from about 2.5 cm×2.5 cm to about 10 cm×10 cm, about 5 cm×5 cm being preferred. The thickness of a pad 65 secured to the base preferably corresponds to the diameter of the pin, the pin projecting from the edge of the pad as shown in FIG. 2. Pads may be secured to the side-walls of the tub, near the base, if the height of the slots in the pivot latches dictates. Pads secured to the sidewalls of the tub, adjacent the base, will have pins projecting at right angles to the surface of the pad secured to the sidewall. Most preferably, the locking pins 61 and 62 are provided on the ends of a rigid strap 64 fixedly secured to the base, which strap locates these pins accurately. The pads and/or strap may be secured to the base with adhesive or with a fastener which is inserted through the base.

The tub 40 is secured on the rack $L^1$ with at least two longitudinally (x-axis) opposed mating attachment means, and preferably three, fixed on the tub and rack, and two of the attachment means are pivot means. At each location, the upper portion of the locking means is fixed on the tub's side-wall just above the tub's planar base 47, but more preferably, is fixed to its base, and the lower portion is fixed to the struts of the rack. The upper portion comprises the two spaced apart, opposed mating pivotable portions, such as locking pins 61 and 62, each of which is matingly held in a pair of spaced-apart pivot latch means, namely container pivot latches 71 and 72 respectively. The spacing of the pivot latches corresponds to the width of the base of the tub, and is typically slightly greater than the width so as to allow the tub to be pivotably located between the two pivot latches. Preferably the upper portion comprises a third locking pin 63 to be matingly held in a third container attachment latch 73. Alternatively, a hasp may be used, one portion of the hasp secured to the tub 41 and the other to the strut 33; or, a clevis through the upper portion of which a bolt is secured. As will be evident, for safety, the tub preferably carries, fixed securely thereto, the upper portion of a mating locking means, and the lower portion is positioned on strut 33, preferably near the end thereof. The particular attachment means used is not narrowly critical being chosen for conveniently securing the container on the transverse strut 33.

The locking means locks the container at two oppositely disposed positions in the mid-portion of the base, preferably near the longitudinal mid-line (x-axis) of the tub, and at a third position near the end of a transverse (y-axis) strut of the rack so that the tub is supported for transport along one edge of its planar base, and across its mid-line, only. The mid-line refers to a line drawn along the x-axis near or through a line dividing the planar bottom in halves. The tub is provided with a handle 45 to pull or push the container, and to exert the force necessary to pivot the container onto the rack. It will be evident that the force required to pivot the container about the longitudinal strut of the rack is a function of the distance from the handle to the mid-line along which the locking pins are located. The greater this distance from handle to mid-line, the less the force required. But the distance from the mid-line to the axis of the wheels on the bottom of the container determines whether the locking pins can be inserted in the pivot latches on the longitudinal strut without lifting the container off the ground. With vertically telescopable wheels, the locking pins on the tub can be positioned so that the pins may be inserted in the pivot latches, and the tub pivoted into position with a minimum of force.

Reverting to FIG. 1, in a first embodiment, the beam $L^1$ is made from rectangular, preferably square, tubular stock having a longitudinally extending (x-axis) strut 32 ("longitudinal strut") and a transversely extending strut 33 ("transverse strut"), both lying in the horizontal plane. Most preferred is square tubular steel stock having nominal outside dimensions of 2"×2" (5.08 cm×5.08 cm). Near one end of the longitudinal strut 32, which end is distally disposed relative to tubular socket 11 fixedly secured to the frame 12 of the vehicle, is provided a vertical mounting stub 51 of rectangular tubular steel into which the accessory rack 50 may be removably slidably disposed. Near the other end of strut 32 which end extends beyond the welded connection of the transverse strut 33 to longitudinal strut 32, the strut 32 terminates in a rectangular tubular shank 34 which slides into the rectangular tubular steel socket 11.

Referring to FIG. 3, the tubular socket 11 and shank 34 are each provided with matching through-passages 13 and 35 respectively, preferably in the transverse direction, through which a cross-bolt or fastening pin is to be inserted and secured in the usual manner with a locking Cotter pin (not shown). The socket 11 typically has a square cross-section in which the hollow square tubular interior measures about 2"×2" which is just large enough to slidably receive a square tubular shank 34. It is essential that each latching means be an attachment means to both, receive a locking pin, then secure it; and, that the locking pin be pivotable in two of the latching means which are spaced-apart on the longitudinal strut of the rack. Thus two spaced-apart pivot latches 71 and 72, and more preferably a third attachment latch 73, are provided on the support beam, preferably by welding them in positions so as to each matingly receive a locking pin introduced in the desired direction whether vertically or horizontally. Most preferred latching means is one such as pivot latch 71 commonly referred to as an "attachment latch" shown in greater detail in FIG. 5A, as viewed in the direction A—A in FIG. 3.

Figure 4:
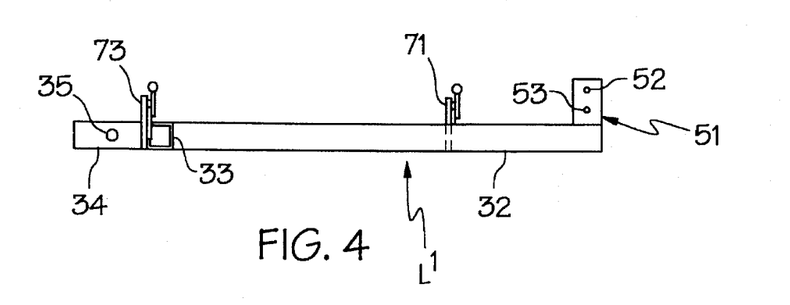
FIG. 4 is a side elevational view of the first L-shaped support beam $L^1$ shown in FIG. 3.

Referring to FIG. 4 there is shown a side elevation view of $L^1$ in which only two pivot latches 71 and 72 are used. If accessory rack 50 is to be mounted, a stub 51 is provided with a pair of vertically spaced apart matching through-passages 52 and 53 respectively, preferably in the transverse direction, through each of which a fastening pin is to be inserted and secured in the usual manner with a locking Cotter pin (not shown).

Figure 5A:
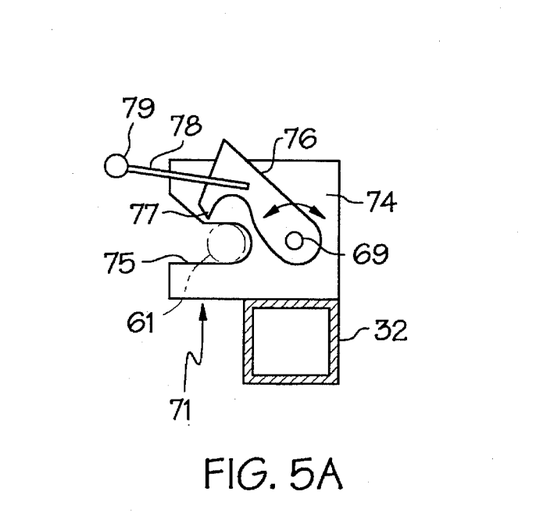
FIG. 5A is a detail of a locking pin (shown in phantom outline) in an attachment or pivot latch fixedly secured on the upper surface of a longitudinal strut, with the latch's U-shaped slot opening to one side, the latch in a horizontal position.

Referring to FIG. 5A, pivot latch 71 comprises a laminar plate 74 having a horizontal, generally U-shaped slot 75 with one of its sides (the upper) flared upward to facilitate guiding a locking pin 61 into it. The locking pin 61, shown in phantom outline, is releasably held in the U-shaped slot by a pivotable catch 76, such as either a manually actuated, or a spring-loaded pawl having a hooked end 77 which fits over the locking pin 61. In the manual mode, the catch 76 is pivotable on a pin 69 about an axis at right angles to the plate 74 with a handle 78 secured to the catch at the end of which handle a ball 79 provides enough weight to hold the catch 76 in position over the locking pin 61. Alternately, the hooked end 75 may be held in place over the pin 61 with a safety pin (not shown). The handle 78 is typically welded to the plate 74 at a location which does not interfere with insertion and release of the locking pin in the slot. As shown, pivot latch 71 is fixed to strut 32 so that both the catch 76 and the handle 78 are on the outside of plate 74 so as to allow the tub 41 of the container 40 to be slid between the plates of the latches 71 and 72. Pivot latch 72, constructed in the same manner as pivot latch 71, is similarly fixed to strut 32, with the U-shaped slot 75 in the horizontal position, and its handle 78 on the outside of plate 74. The tub 41 may therefore be received between the opposed plates 74 of pivot latches 71 and 72.

Figures 5B, 5C, 6, 7:
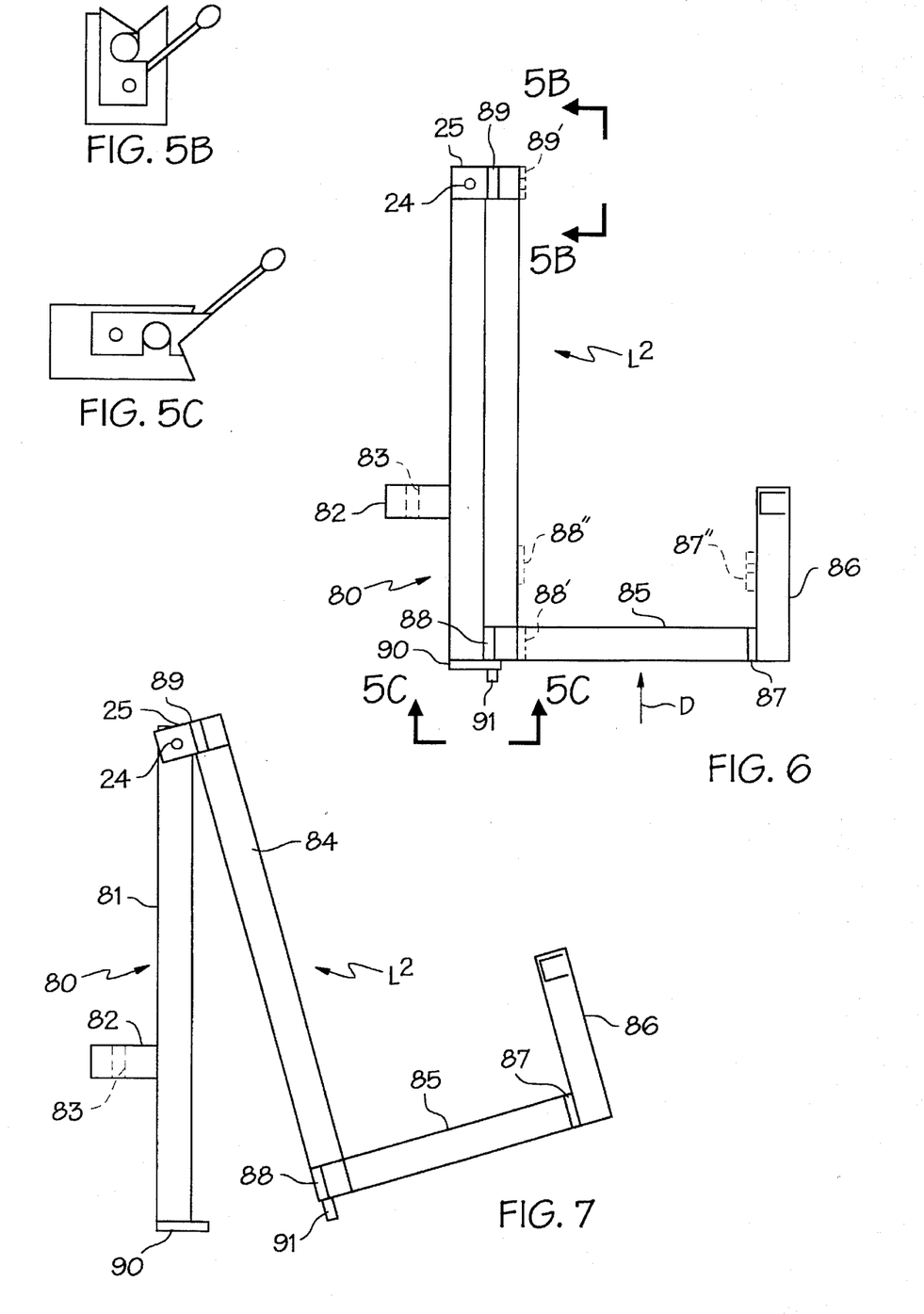
FIG. 5B is a detail of a locking pin (shown in phantom outline) in an attachment or pivot latch fixedly secured on the upper surface of a longitudinal strut, with the latch's U-shaped slot opening upward, the latch in a vertical position.
FIG. 5C is a detail of a locking pin (shown in phantom outline) in an attachment or pivot latch fixedly secured on the end of a transverse strut with the latch's U-shaped slot opening to one side, the latch in a horizontal position.
FIG. 6 is a plan view of a second embodiment of the L-shaped support beam "$L^2$" loaded and unloaded from the driver's side of the truck. $L^2$ comprises a transverse compound arm which includes a pivot strut and the transverse arm of the L-shaped support beam $L^2$ upon which the container rests, and which $L^2$ is pivotable in the horizontal plane, attached to the pivot strut.
FIG. 7 is a schematic plan view of the generally L-shaped support beam shown in FIG. 6 when $L^2$ is pivoted outwardly on a pivot means near the end of the transverse pivot strut.

As shown in FIG. 3, a third latch, attachment latch 73, constructed in the same manner as pivot latches 71 and 72, is similarly fixed to strut 32, at the end thereof, except that the U-shaped slot 75 is in the vertical position, shown in the detail schematic illustration FIG. 5B, open at the top to accept a locking pin lowered into the opening, and as before, both the catch 76 and handle 78 are on the outside of plate 74. The distance along the strut 33 at which attachment latch 73 is located is not narrowly critical, being chosen so as to matingly receive locking pin 63 located near the end of the base. The orientation of the U-shaped slots in latches 71, 72 and 73 is likewise not narrowly critical, and may be in either the horizontal or vertical position, but for safety, at least one, and preferably all three of the latches used on the L-shaped support beam should be positioned with the U-shaped slot in an upwardly inclined, preferably vertical, position as shown in FIG. 2, to ensure that the container 40 is securely and safely held in position.

With the pivot latches 71 and 72 and attachment latch 73 positioned as shown in FIG. 3, and the locking pins 61, 62, and 63 secured to pads 65 on the lower surface of the base, it will be seen that the upper surfaces of struts 32 and 33 will be in contact with the planar base, supporting it along a portion of its side and across its width, providing support for the base of the container. As shown, locking pins are provided in the 'near' (relative to the loading direction) half of the tub's base so that when held in pivot latches 71 and 72 on strut 32, it extends across the base in the near half; and, strut 33 is more than one-half, typically about 56 cm (22"), the length of the tub, so that attachment latch 73 secures a locking pin 63 near the far corner of the tub. The container is thus supported in a symmetrical position about the longitudinal axis.

It will now be evident that in its first embodiment the carrier assembly 20 comprises the integral L-shaped support beam $L^1$ constructed of rectilinear struts connected to the frame 12 with a shank 34, and the wheeled container 40 which has a planar base 47 releasably secured on the rack. $L^1$ includes a longitudinal strut 32 and a transverse strut 33 extending at right angles to the longitudinal strut, on only one side thereof; and, one side of the transverse strut is removably attached by shank 34 to the truck's frame 12. The strut 32 is at least as long as the planar base 47 is wide, and the strut 33 extends at right angles to strut 32, and generally parallel to, and in close proximity with the bumper. At least two spaced-apart pivot latches 71 and 72 are fixedly secured to the strut 32 at a distance corresponding to the width of planar base 47 which pivot latches matingly receive locking pins to allow the container to be pivoted onto the rack $L^1$. Oppositely directed, spaced-apart locking pins 61 and 62 are provided on the container, at or near its base, and these pins protrude longitudinally along a line drawn through the mid-portion of the base. The locking pins 61 and 62 are insertable in the pivot latches 71 and 72 without lifting the container off the ground. Preferably, a third locking pin 63 is provided on the container, at or near its base, and pin 63 is matingly secured in an attachment latch 73 on transverse strut 33. The container 40 has coaxial spaced-apart wheels 44 fixedly secured near one end of the base 47 to allow the container to be rolled in an inclined attitude.

In a second embodiment, illustrated in plan view in FIG. 6, with the orientation of attachment latch 89 upward, the container can only be loaded onto the rack in the direction of the arrow D, that is, from the driver's side of the truck. The planar L-shaped support beam comprises a longitudinal strut 85 and a transverse compound arm 80 including (i) a pivot strut 81 (so termed because a pivot means is secured to one end) extending on either side of a longitudinal tubular shank 82, and (ii) a transverse strut 84 coplanarly disposed with the pivot strut 81. Strut 85 and strut 84 form an integral support beam $L^2$ which pivotably supports the base of the tub, and strut 84 is pivotable about the far end ("far end" with respect to the direction of loading) of the pivot strut 81.

Where an accessory rack 50 is desirable, $L^2$ includes a short strut 86 coplanarly disposed with struts 84 and 85, the length of strut 86 preferably being chosen to align mounting stub 51 with the shank 82. Struts 84 and 86 are longitudinally spaced-apart in parallel relationship by strut 85. Strut 85 is disposed at right angles to the longitudinal axis, so that the base of the container is supported upon strut 84 on one side, near the edge of the base, and by strut 85 across the base, along a line in that half of the base which is distally disposed relative to the 'far' end of ("far" relative to the loading direction) strut 84. The relative lengths of 84 and 85 depend upon the dimensions deemed desirable for the container, strut 84 being longer than 85, so that the container is supported lengthwise in the horizontal plane. As illustrated, the length of strut 84 is chosen so that strut 85 is displaced from the longitudinal axis, but such displacement is not essential. As before, the mating locking pins 61 and 62 for pivot latches 87 and 88, and the locking pin for latch 89 may be positioned at the base, or, on the sidewalls near the base of the tub to be received in pivot latches 87 and 88 which are positioned along a line drawn through a portion of the base near the 'near' (relative to the loading direction) end (the left or forward sidewall) of the tub.

Locking means comprising pivot latches 87, 88 and attachment latch 89 are provided to accept locking pins 61, 62 and 63 respectively, appropriately positioned on the container, the pivot latches and attachment latch being the same as 71, 72 and 73 respectively. When the strength and rigidity of the tub is sufficiently great, the container may rest on the locking pins and their pads without supporting the planar base itself, as shown in FIGS. 2, 6 and 7. To pivot the container over the longitudinal strut 85, the pivot latches 87 and 88 and the attachment latch 89 are oriented vertically with their U-shaped slots opening upward, as is attachment latch 89 (see FIG. 5B).

It will now be evident that pivot latches 87 and 88 afford the greatest mechanical advantage when they are positioned along strut 85. To support the tub so that its base rests on the surface of struts 84 and 85, and the latches 87, 88 and 89 positioned vertically as shown in FIG. 5B, the pins 61, 62, 63 are positioned on the sidewalls of the tub, near the base so as to be received in the latches. To support the tub so the pads 65 on the lower surface of the base rest on the struts, latches 87, 88 and 89 are positioned as shown in FIG. 5C. Alternatively, pads 65 may rest on strut 85 when latch 88' (shown in phantom outline) is positioned as shown, and the far end of the tub rests on a pin received in latch 89' positioned as shown in phantom outline. The tub may rest on the locking pins only, when the latches are positioned as shown at 88", 89" and 89" shown in phantom outline.

The shank 82 is provided near one end with a passage 83 therein for a fastening pin, analogous to that provided for shank 34, so that the end may be secured in socket 11. At the 'far' end of cross-member 81 is provided a vertical through-passage for a pivot pin 24; at the 'near' end of 81 is fixedly secured a beam attachment means, preferably attachment latch 90 which is substantially identical to pivot latches 71 and 72, and like them, is used with the U-shaped slot 75 in a horizontal position, the slot opening horizontally, as shown in FIG. 5C, to receive locking pin 91 distally disposed relative to channel stock 25, and projecting transversely from the end of strut 84.

Strut 84 is pivotably attached near one end thereof, to the far end of the pivot strut 81 to allow transverse strut 84 to swing in the horizontal x-y plane. Since it is desirable to dispose pivot strut 81 as closely adjacent to the outer surface of the rear door as practical, the pivot means is chosen to do so. As before, such pivoting is conveniently accomplished by welding a short section of channel stock 25 over the end of the strut 84 and slidably inserting the end of strut 81 into the channel section before inserting the pivot pin 24. Strut 84 may be spaced apart from pivot strut 81 by choosing a longer section of channel stock 25, to afford other locations for the pivot latches and attachment latch, but changing such positions serve no useful purpose. Attachment latch 89 is secured to the channel stock 25.

The support beam $L^2$ in a "swung-away" position is schematically illustrated in FIG. 7. As before, it is preferred to limit the swing to less than 90° from its locked position so as to minimize the stresses on the pivot means, yet provide desired access to the interior of the truck.

Figure 8:
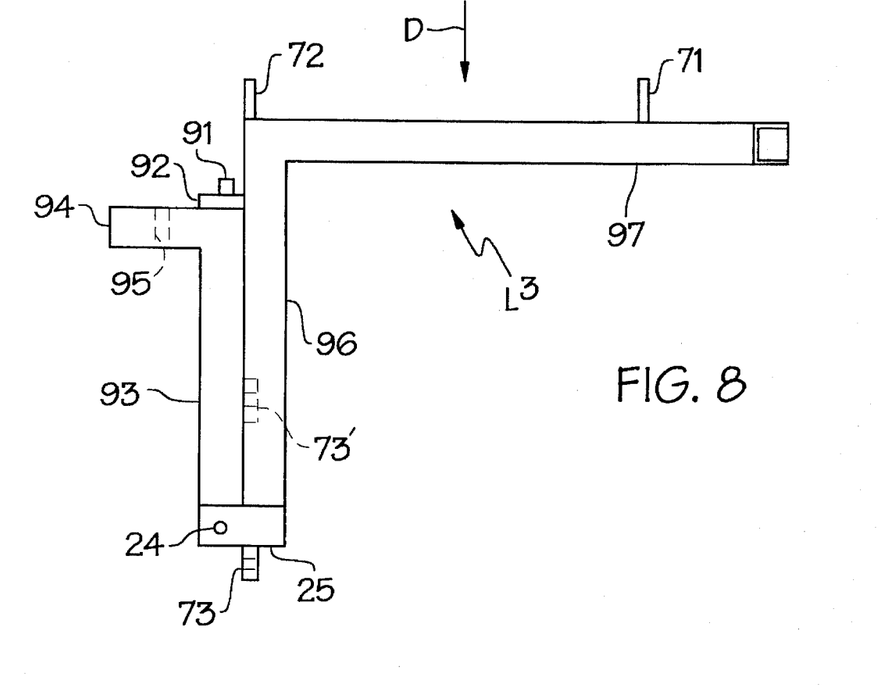
FIG. 8 is a plan view of a third embodiment of the generally L-shaped support beam $L^3$ loaded and unloaded from the passenger's side, having a transverse compound arm which includes a pivot strut and the transverse arm of $L^3$ upon which the container rests, and which $L^3$ is pivotable in the horizontal plane, attached to the pivot strut.

In a third embodiment, illustrated in plan view in FIG. 8, the container can only be loaded on the rack in the direction of the arrow, that is, from the passenger's side of the truck, but the container can only be loaded onto the rack in the direction of the arrow D, that is, from the passenger's side of the truck. As shown, the pivot latches 71 and 72 are oriented horizontally (see FIG. 5A) as in FIG. 3.

As shown in FIG. 8, the planar L-shaped support beam comprises a longitudinal strut 97 and a transverse compound arm including (i) a pivot strut 93 extending on either side of a longitudinal tubular mounting shank 94, and (ii) a transverse strut 96 coplanarly disposed with the pivot strut 93. Struts 96 and 97 form an integral support beam $L^3$ which supports the base of the tub, so that the tub is pivotable about one end (the "far end") of the pivot strut 93. The height of strut 97 corresponds to the height of opposed locking pins in the 'near' portion of the planar base when the container, with its wheels on the ground, is placed against the strut 97. It will be appreciated that the closer to the 'near' end that the mounting pins 61 and 62 are placed, the more vertical must be the inclination of the container to insert the pins in the latches 71 and 72. Also, choice of the transverse length of strut 96 will affect the length of a container which can be safely secured on $L^3$, the longer the transverse strut 96 the more stably the container is supported. The length of strut 96 is preferably chosen to place attachment latch 73 at the far end of the tub. When all three pads 65 are secured to the lower surface of the base, and the surfaces of struts 96 and 97 are to contact the lower surface of the tub's base, latch 73 is positioned as shown on the stub 25. If positioned at 73' shown in phantom outline, the far end of the tub rests on pad 65 of pin 63, and the pad in turn rests on strut 96. The height of the bumper of a conventional truck determines the distance of the locking pins 61 and 62 from the axis of the wheels.

Figure 9:
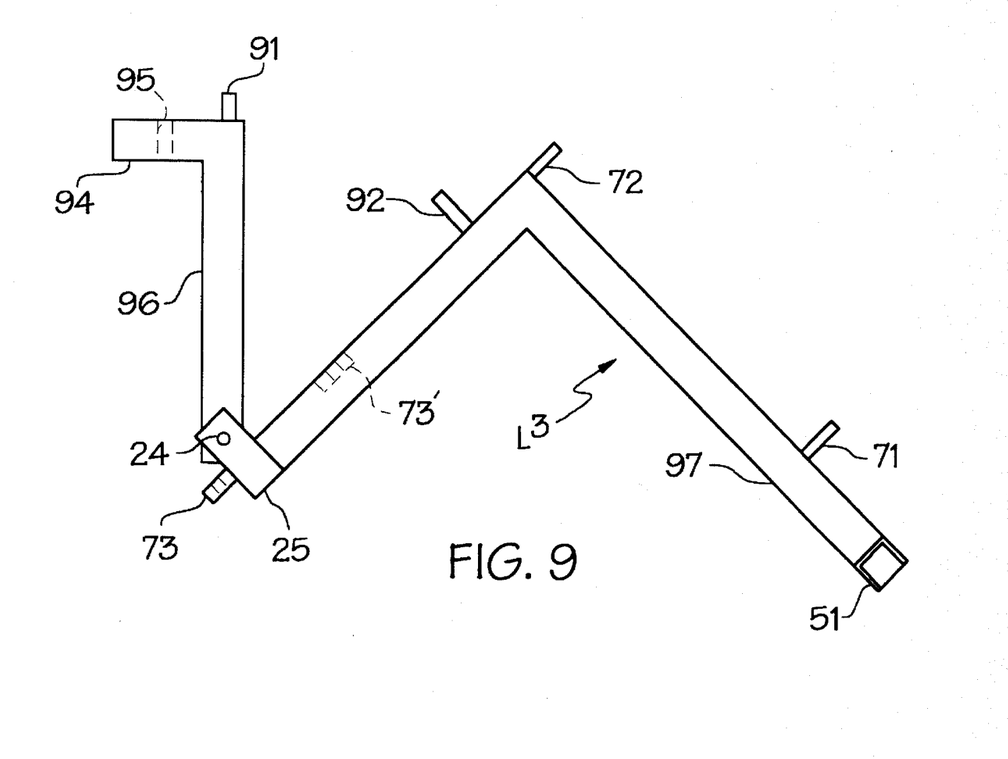
FIG. 9 is a schematic plan view of $L^3$ shown in FIG. 8 when the transverse arm of $L^3$ is pivoted outwardly on a pivot means near the end of the pivot strut.

As before, the orientation of latches 71 and 72 is not critical, and could be vertically oriented as were latches 87 and 88; and, depending upon whether the pads are placed on the bottom of the tub, or on the sidewalls, the tub may rest on the pads, or on the struts. The shank 82 is provided with a passage 83 therein for a fastening pin to secure the shank's end in socket 11. At the far end of pivot strut 96 is provided a vertical through-passage for a pivot pin 24; at the near end of pivot strut 93 is fixedly secured a locking pin 91 which is received in attachment latch 92. Latch 92 is substantially identical to pivot latches 71 and 72, and like them, is used with the U-shaped slot 75 in a horizontal position, the slot opening horizontally to receive locking pin 91, which is distally disposed relative to channel stock 25, and projecting transversely from the end of strut 93. FIG. 5C illustrates the orientation of latch 92, as seen from the loading direction. The support beam $L^3$ in a "swung-away" position is schematically illustrated in FIG. 9. As before, it is preferred to limit the swing to less than 90° from its locked position so as to minimize the stresses on the pivot means, yet provide desired access to the interior of the truck.

Having thus provided a general discussion, described the overall process in detail and illustrated the invention with specific examples of the best mode of making and using the invention, it will be evident that the invention has provided an effective solution to a problem to which many have sought a good solution. It is therefore to be understood that no undue restrictions are to be imposed by reason of the specific embodiments illustrated and discussed, and particularly that the invention is not restricted to a slavish adherence to the details set forth herein.

I claim:

1. A cargo carrier for a vehicle, the vehicle having longitudinal axis along the length thereof, said cargo carrier comprising, a rack comprising an L-shaped support beam in combination with a wheeled container having a generally planar base pivotably disposed upon said beam and releasably secured thereupon; and, a connection member for removably connecting said L-shaped support beam to said vehicle's frame;

said L-shaped support beam selected from the group consisting of (i) a single, integral first L-shaped support beam $L^1$ having a longitudinal strut extending substantially parallel to the longitudinal axis, and a transverse strut extending at right angles to said longitudinal strut; and, (ii) a second L-shaped support beam $L^2$ having a longitudinal strut extending substantially parallel to the longitudinal axis, and a transverse compound arm extending at right angles to said longitudinal strut;

said longitudinal strut being at least as long as said planar base is wide, and having two longitudinally spaced-apart pivot latch means secured thereto at a distance at least corresponding to said planar base's width, said pivot latch means being adapted to support said container upon said longitudinal strut, allow it to be rotated in a vertical plane from one side only of said longitudinal strut, and, to be secured in position by means associated with said support beam;

said transverse strut supporting that portion of the container not supported by said longitudinal strut, and extending for a sufficient distance along one side of said planar base and in close proximity to said truck's bumper, to afford stable support for said container;

said container having fixedly secured thereto, (i) two oppositely directed, spaced-apart locking pins to be matingly received in said pivot latch means, said locking pins protruding longitudinally, and, (ii) coaxially spaced-apart wheels fixedly secured near one end of said base to allow said container to be rolled in an inclined attitude;

said locking pins being insertable in said pivot latch means from one side of said longitudinal strut only, without lifting said wheels off the ground, thereafter to enable said container to be pivoted into the secured position with said transverse strut providing support for said container;

said container having a width less than that of a doorway through which it is to be rollingly transported in an inclined attitude, and a length less than the spacing of said vechicle's tail lights.

2. The carrier of claim 1 wherein said transverse strut has fixedly secured thereto, at a location distally disposed relative to said longitudinal strut, said securing means comprising an attachment latch to matingly receive a locking pin secured to said container, near the base thereof.

3. The carrier of claim 1 wherein said longitudinal strut has fixedly secured thereto, at a location distally disposed relative to said transverse strut, socket means to matingly receive a vertical post of an accessory rack.

4. The cargo carrier of claim 1 wherein, in said generally L-shaped support beam $L^2$, said transverse compound arm includes a pivot strut and a second transverse strut pivotably attached near one end of said pivot strut, for swingable motion of said second transverse strut in a horizontal plane, from a position adjacent to and parallel with said pivot strut, to a position away from said pivot strut so as to provide sufficient displacement to allow access to said vechicle's interior, said one end being distally disposed relative to said longitudinal arm in the direction of loading said container, and said pivot strut has said connection member connected thereto;

attachment means for releasably attaching said, transverse strut to said pivot strut; and, said locking pins protrude substantially along a line drawn through the mid-portion of said base.

5. The carrier of claim 1 wherein said container includes a tub having a volume in the range from about 15–30 ft$^3$.

6. The carrier of claim 1 wherein said container is substantially rigid and formed of a light weight material selected from the group consisting of a synthetic resinous material, a fiber reinforced synthetic resinous material, a metal composite and aluminum.

7. The carrier of claim 1 wherein said L-shaped support beam is constructed from rigid, rectilinear, rectangular tubular struts.

8. The carrier of claim 1 wherein the direction of loading said container on said L-shaped support beam is from only one side of said vehicle, said direction being determined by the side on which said pivot latch means on said longitudinal strut matingly receive said locking pins.

9. The carrier of claim 1 wherein said container is pivotably supported for pivotable motion in both the horizontal and vertical planes, by only said longitudinal strut and said transverse strut, over a major portion of said base's area.

10. The carrier of claim 1 wherein said pivot latch means are oriented to receive said locking pins so that said longitudinal strut and said transverse strut are each in direct contact with said base's lower surface, said longitudinal strut extends across said base and said transverse strut extends along only one side of said container.

11. The carrier of claim 1 wherein said locking pins project from pads secured to said base's lower surface, said pivot latch means are oriented to receive said locking pins so that said pads are supported on said longitudinal strut and said transverse strut, said longitudinal strut extends across said base and said transverse strut extends along only one side of said container.

* * * * *